United States Patent
Bansal et al.

(10) Patent No.: US 11,303,727 B2
(45) Date of Patent: Apr. 12, 2022

(54) METHOD AND SYSTEM FOR ROUTING USER DATA TRAFFIC FROM AN EDGE DEVICE TO A NETWORK ENTITY

(71) Applicant: JIO PLATFORMS LIMITED, Ahmedabad (IN)

(72) Inventors: Rajat Bansal, New Delhi (IN); Anil Pawar, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 3 days.

(21) Appl. No.: 16/862,421

(22) Filed: Apr. 29, 2020

(65) Prior Publication Data

US 2020/0358878 A1 Nov. 12, 2020

(30) Foreign Application Priority Data

Apr. 30, 2019 (IN) .............................. 201921017248

(51) Int. Cl.
*G06F 15/16* (2006.01)
*H04L 67/63* (2022.01)
*H04W 76/12* (2018.01)
*H04L 43/028* (2022.01)
*H04L 29/06* (2006.01)
*H04W 80/04* (2009.01)

(52) U.S. Cl.
CPC .......... *H04L 67/327* (2013.01); *H04L 43/028* (2013.01); *H04L 63/0227* (2013.01); *H04L 63/0876* (2013.01); *H04L 63/20* (2013.01); *H04W 76/12* (2018.02); *H04L 2212/00* (2013.01); *H04W 80/04* (2013.01)

(58) Field of Classification Search
None
See application file for complete search history.

(56) References Cited

U.S. PATENT DOCUMENTS

| | | | |
|---|---|---|---|
| 2002/0069278 A1* | 6/2002 | Forslow | H04L 63/0272 709/225 |
| 2017/0085529 A1* | 3/2017 | Finkelstein | H04L 63/162 |
| 2019/0007236 A1* | 1/2019 | Ishii | H04L 12/4633 |
| 2020/0169856 A1* | 5/2020 | Yang | H04L 43/16 |
| 2020/0296023 A1* | 9/2020 | Kumar | H04L 43/103 |
| 2020/0296029 A1* | 9/2020 | Shenoy | H04L 43/12 |

\* cited by examiner

*Primary Examiner* — Gerald A Smarth
(74) *Attorney, Agent, or Firm* — Klarquist Sparkman, LLP

(57) ABSTRACT

The present disclosure provides a method [400], a system [200], an edge device [204] and a computer program for routing user data traffic from an edge device [204] to a network entity [206]. The method encompasses receiving, at least one data packet of user data traffic relating to a request for availing a service, via an authenticated user device. The method thereafter comprises identifying, one or more parameters from the at least one data packet of user data traffic. Further the method comprises generating, one of a positive and a negative response based on the identified one or more parameters and a corresponding policy associated with each parameter. Thereafter, the method routes the user data traffic to an EoGRE tunnel to transmit said user data traffic to a network entity [206], based on the positive response.

10 Claims, 5 Drawing Sheets

METHOD AND SYSTEM FOR ROUTING USER DATA TRAFFIC FROM AN EDGE DEVICE TO A NETWORK ENTITY

FIELD

The embodiments relate to wireless communication and more particularly to providing edge services to a user device connected to a Wi-Fi Network or Het-Net environment.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Wireless communication networks are widely deployed to provide voice as well as data services. These wireless networks may be multiple access networks which can support multiple users by sharing the available network resources. Examples of multiple access network formats include Universal Terrestrial Radio Access Network (UTRAN), Evolved UTRAN (E-UTRAN), Code Division Multiple Access (CDMA) Networks, Time Division Multiple Access (TDMA) Networks, Frequency Division Multiple Access (FDMA) Networks, Orthogonal FDMA (OFDMA) Networks, and Single Carrier FDMA (SC-FDMA) networks.

In a typical network, a wireless communication network may include several base stations or eNodeBs that can support voice and data communication for multiple user equipment (UEs). In a traditional cellular deployment, suitable powered macrocells are deployed to cover sufficiently large areas. However, the macrocells-only deployment generally suffers with quick capacity degradation as the number of user device/user equipment (UE) operating in the macrocells coverage areas increase.

Therefore, operators are now reinforcing their macrocells deployment with one or multiple small cell/Wi-Fi access point with backhaul of LAN on optic fiber placed at multiple strategic locations within one or more macro coverage areas. This kind of reinforced cellular network is generally termed as Heterogeneous network, in short, Het-Net. Small cells are low powered base station and includes Micro Cell base station, Pico Cell base station, or Femto Cell base station. To provide last mile connectivity and to reduce coverage blackspots in the network coverage area, service providers are deploying small cells and Wi-Fi access points over LAN in offices, malls, shopping complexes, etc.

Referring now to an exemplary case of a typical heterogeneous network (Het-Net). It comprises macro base station for providing wide area coverage to serve users. Within the macro cell, several low power nodes are employed in service areas having a higher density of users requiring high data rates. Examples of such low power nodes comprises micro cells. Micro cell integrated with Wi-Fi radio are also used widely to provide multi technology hotspot capacity/coverage goals. The operators could also deploy independent & cost-effective Wi-Fi Access points in hotspot areas to offload cellular load, and to meet capacity/coverage requirements of users.

In recent years, Wi-Fi technology based on IEEE 802.11 standards has also seen tremendous growth and commercialization. Almost all available UE (user equipment) with cellular capability support have now Wi-Fi capability by default to connect to Wi-Fi networks operating in either of the unlicensed frequency bands, 2.4 GHz, or 5 GHz. This fact, therefore, is also motivating cellular operators to use ubiquitous and cost-effective Wi-Fi technology in pursuing their Het-Net strategy. Many operators are now deploying low powered Wi-Fi cells.

Another reason for deploying a greater number of Wi-Fi cells/access points is that majority of data services consumption takes place in indoor coverage area, and thus it becomes imperative to provide better network coverage in residential/commercial complexes. Also the cost and challenge to use cellular macros for indoor coverage are quite high and, they are not able to provide adequate performance in terms of the phone reception and call quality.

The 3GPP standard defines two types of access; trusted and untrusted non-3GPP access. Non-3GPP access includes access from for instance Wi-Fi, WiMAX, fixed and CDMA networks. Trusted non-3GPP Wi-Fi access was first introduced with the LTE standard in 3GPP Release 8 (2008) and onwards.

Trusted access is often assumed to be an operator-built Wi-Fi access with encryption in the Wi-Fi radio access network (RAN) and a secure authentication method. In a trusted access, the device (UE) is connected through a TWAG (Trusted Wireless Access Gateway) in the Wi-Fi core. The TWAG is in turn connected directly with the P-GW (Packet Gateway) in the Evolved Packet Core (EPC) through a secure tunnel (GTP, MIP, IPSEC or PMIP).

Nearly all cellular coverage deployed worldwide today is delivered using outdoor 'macro' systems that work well outdoors but generally coverage does not penetrate inside buildings very well. On the other hand, Wi-Fi works well with acquired sites and has acceptability in private properties like homes, hospitals, malls, enterprise office, etc.

Also, we know that worldwide Wi-Fi coverage is becoming very common at homes, businesses and in public places & most often in indoor premises. When one person gets a wireless broadband connection, it not only gives coverage in his own house but most of the time, the coverage ramps up to streets/neighbour's house/other building etc. i.e. according to geography.

In general, cellular operators or the Internet Service Providers (ISPs) incur substantially lesser costs in setting up Wi-Fi access infrastructure compared to mobile broadband networks like 2G/3G/4G. This is because Wi-Fi technology utilizes unlicensed spectrum, the equipment is both cheaper and more readily available and maintenance and operational costs are significantly lower. It will of course need to consider the need for backhaul connectivity to the Internet to provide Wi-Fi broadband services. The lower cost of Wi-Fi delivery should easily translate into lower prices per MB for the end-users, making it a more affordable service.

The UEs or devices play an important role for seamless experience from Wi-Fi coverage to cellular coverage and vice-versa. The UEs with built-in native diallers for Voice over Wi-Fi (Vo-WiFi) are compliment for the seamless experience but VoWiFi based application dialler also solves the purpose. The seamless authentication for one group of UEs that support Hotspot 2.0 (HS 2.0) and others which do not support HS 2.0 where cellular devices require to support a seamless authentication protocol (like for 2G/3G, the EAP SIM protocol and for the LTE, the EAP AKA). For UEs not supporting HS 2.0, the device shall need to get configuration in various methods for first time like manual EAP configuration or by pushing configuration from device software application or network to initiate configuration push.

The Internet of Things/Everything (IoT/IoE) is a network of devices, vehicles, home appliances, and other items embedded with electronics, software, sensors, actuators, and connectivity which can be readable, recognizable, locatable, addressable, and controllable via an IoT communications network that enables these things to connect and exchange data, creating opportunities for more direct integration of the physical world into computer-based systems, resulting in efficiency improvements, economic benefits, and reduced human exertions.

The "Internet of Things/Everything" (IoT/IoE) concept is getting more and more popular, and devices, such as sensors, actuators and everyday objects including the coffee makers, washing machines, headphones, lamps and wearable devices, etc. are being increasingly looked upon as potential IoT devices. IoT involves extending internet connectivity beyond standard devices, such as desktops, laptops, smartphones and tablets, to any range of traditionally dumb or non-Internet-enabled physical devices and everyday objects. Embedded with technology, these devices can communicate and interact over the Internet, and they can be remotely monitored and controlled.

Also, for the HS 2.0 enabled UEs, these can seamlessly latch to trusted public/private SSID based on the network identifier like PLMN information MCC/MNC, NAI REALMS information. Also, during selection on known SSID's, EAP Authentication method generally get preference over PSK based authentication. All Radio plane, along with modem plane and router plane support for optimized routing based on throughput and bandwidth. One of the important UE devices is Customer Premise Equipment (CPE) and all the terms like CPE, Wi-Fi router, ONT, are inter-changeably used in this disclosure.

The router comprising components like a modem component, router component, a wireless communications component, processor/processors, at least one tangible electronic memory storing numerous computer-executable modules and data and a network plane with backplane for connectivity with physical interface. Examples of some of the router plane modules includes a traffic segregation module, routing module, egress traffic module, ingress traffic module, network/traffic identifier module, network policy management module, session management module, network management module, automatic location management module, authentication module, bandwidth negotiation module, billing interface module and activity-based location module. Also, there may be other modules to support operations, administration and maintenance activities of the apparatus. Implementations of such an apparatus may be embodied, for example, with the use of router plane, modems providing voice and data services over wireless connection that can route traffic from the wireless device to a backhaul connection. For example, the optimized routing algorithms may be applied either inside the network or at CPE and options may be provided to the interface (e.g., display screen) of the user devices for selection. Alternatively, the network may perform the selection automatically (e.g., based on default setting or predetermined rules) without selection by the user. Some examples of optimized routing algorithms include, but are not limited to, least cost routing (e.g., a routing path with least cost), bandwidth intensive routing (e.g., a routing path to maximize bandwidth and QoS, based on the application type), least congestion routing (e.g., a routing path to reduce dropping of packets, e.g., to support voice services), customer routing (e.g., a routing path that stays on the provider's network as much as possible across networks), and other comparable routing techniques.

The following components constitute the details of the Wi-Fi network system.

Access Points (AP): A device that acts as the bridge between wireless clients and the wired network. This is responsible to participate in process of UE association and authentication.

Association is the process to initiate a client to begin exchanging data with an Access Point. The client will listen for beacons from an AP for the SSID that the UE wants to use, and then will exchange hello packets with the AP with the strongest signal and/or supported data rates. The association can be open, or can require a pre-shared key. Once associated, the client may be required to successfully authenticate before the AP will pass data between the client and the rest of the network.

A client may be required to authenticate to the wireless network before it can pass data between itself and other hosts. Authentication can be open, but can also require a certificate, username/password, or pre-shared key.

Wi-Fi Gateway: A WLAN network gateway is the piece of networking hardware used in telecommunications via communications networks that allows data to flow from one discrete network to another, in given case it controls and connect the traffic from UE to the Intra/Internet.

Service Set Identifier (SSID): The SSID is the name of the wireless network. It can be contained in the beacons sent out by APs, or it can be 'hidden' so that clients who wish to associate must first know the name of the network. Early security guidance was to hide the SSID of your network, but modern networking tools can detect the SSID by simply watching for legitimate client association, as SSIDs are transmitted in clear-text.

Hotspot: An AP set up specifically to provide Internet access to users. Hotspots are popular in coffee shops, restaurants, and other publicly accessible locations, and usually require some level of authentication and offer encryption. They provide the convenience of free Internet access to attract customers at public places.

Open Network: An open wireless network permits association and authentication without requiring a passphrase, certificate, or credentials. Open networks are often hotspots and provide free Internet access to anyone within range. Many coffee shops and restaurants will deploy these to attract customers. They may still incorporate a captive portal.

Issues with the Current Approach:

With the growing demand from the UEs, IoT, IoE, etc. for various services, there is an emerging challenge of huge load of control traffic on transport and core network layers. In traditional deployment, all the traffic that need to be acted upon is taken to core network/network entity for processing and later dropped or returned with response back to the transport network. This not only loads the transport network but also give rise to number of other complexities like traffic load that may get encapsulated between the clients and hence require lot of additional computational power. There is a challenge to optimize the network at the edge for the various services with the growing traffic by dropping all unwanted traffic at the CPE/edge device.

Referring to FIG. 1, the common issue of congestion which can go worse with growing data on network is shown. In FIG. 1 at a customer premises [102] a connectivity between a number of access points [110] and wireless networks [112] with routing devices [108] is shown. Also, at transport network [104], a network [114] (microwave/optical/MPLS etc.) is shown. Further at a network entity [106], network components such as a database [118] is shown. Further, as per the known (traditional) system architectures [i.e. 100], when any service request is transmitted via a plurality of user devices at the customer premises [102] level, it results into a congestion at transport network due to which the load at the network [114] increases further resulting into the degradation in the quality of the provided services. Further, a high capacity augmentation situation is indicated at the network entity [106], wherein the high capacity augmentation situation is occurred due to the increase in traffic at transport network [116].

Another major challenge is that, for majority of the enterprise requirement/use-cases, the packet can be inspected with shallow packet inspection (SPI) rather than to have content-based inspection and to keep database of the website as well as application that may or may not be accessed by the users of given demography which require whole lot of processing through such database. Also, expectation is to curb network threats, content filtering, etc. Each enterprise or institution may have unique/specific needs and they may need some level of local management and controls.

Furthermore, the existing AP based URL filtering has limitation as it doesn't support filtering of millions of devices. Also, there is challenge of network entity (TWAG) that supports 3rd Party AP that runs on Radius with Open SSID but don't support EoGRE/secure tunnel/encryption.

The existing techniques may accomplish this, but it has its own challenges which are detailed below.

Packet Inspection solution is a probable solution, but it has its own limitations such as:
  The solution is centralized and not cost effective, is hard to deploy, hard to scale, has high operation and maintenance cost and cannot check https traffic without human intervention, etc. Also, it can lead to a single point of failure.
Centralized URL filtering solution:
  This solution causes lot of unwanted control plane and data plane traffic loading for the traffic that needs to be dropped.
  Centralized or network distributed service systems cause huge load on transport and core network to process unwanted traffic.

There have been technical challenges/problems to optimize the network at the edge for various services with the growing traffic by dropping all unwanted traffic. Also, there are challenges for enterprise requirement/use-cases where the packet needs to be inspected with shallow packet inspection rather than to have content-based inspection. Also, there is challenge of each enterprise or institution having unique/specific needs and they may need some level of local management and controls. Furthermore, there is drawback with centralized and cloud-based solution, where there can be enterprise outage in case there is interruption in cloud connectivity, where interruption can be planned or unplanned.

From the above stated limitations of the current known solutions it is clear that, there is a need for a solution to optimize the network at an edge device, for the various services with the growing traffic. Therefore, in order to overcome the above stated and the other existing limitations of the current known solutions, the present disclosure provides an efficient method, system and apparatus for routing user data traffic from an edge device to a network entity.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present disclosure is to provide solution to optimize the network at the edge device for the various services with the growing traffic by dropping all unwanted traffic at the edge device. Another object of the present invention is to prevent unnecessary loading of transport network, as with cloud-based architecture the present invention can help to give advantage of multi-tenant, multilevel-access and centralized control. Also, one other object of the present invention is to provide a solution for edge based polices like URL filtering, SD-WAN, analytics etc., where unwanted data need not go across to the core network/network entity for processing and response. The one more object of present invention is to provide a solution for a hybrid network, where all the last accessed polices need to be solved locally, where any interruption in cloud connectivity will not impact the last provisioned policies. Another object of the present invention is to provide a solution to avoid loading the complete transport and network entity platform. Also, one more object of the present invention is to provide a solution for continuously updating policies for each enterprise by the service provider. Another object of the present invention is to provide a solution to avoid complexity for third party access or small cell integration which increases the complexity of overall integration and platform enhancement. Another object of the present invention is to provide solution, where core network can control and segregate the various services for subscriber. Yet another object of the present invention is to provide edge control where network can control the access of subscriber in very flexible manner like from restricting one's usage or to make allow ones' access to all places except one and different combination thereof. The one other object of the present invention is to reduce cost of compute at the network entity/core network and make a huge saving on deployment as this solution is faster to deploy as plug n play. Also, the object of the present invention is that the new designed architecture provides solution for network operator that is independent of network vendor limited policies and provide an open platform where an operator can introduce number of use cases that are relevant to the given operator. One other object of the present invention is that the new designed architecture provides solution for network operator that is beneficial from the perspective that solution is not based on the DPI (deep packet inspection) as this is expensive solution in Het-net environment. Another object of the present invention is that the new designed architecture provides solution for the majority of the traffic that is not allowed by enterprise (fixed cost accounts) that is huge saving on both control and data traffic on transport and core network. Yet another object of the present invention is that the new designed architecture provides solution for usage of the same solution on different hardware including hardware of AP which gives a flexibility and edge over competitors.

In order to achieve the afore-mentioned objectives, the present disclosure provides a method, a system, an apparatus and a computer program for routing user data traffic from an edge device to a network entity. One aspect of the invention relates to a method of routing user data traffic from an edge device to a network entity. The method comprises receiving, at an edge device, at least one data packet of user data traffic relating to a request for availing a service via an authenticated user device. The method thereafter comprises identifying, via the edge device, one or more parameters from the at least one data packet of user data traffic, wherein the one or more parameters comprises at least one of a user device type, a URL type and an application type. Further the method comprises generating, via the edge device, one of a positive and a negative response based on the identified one or more parameters and a corresponding policy associated with each parameter. Thereafter, the method comprises routing, from the edge device, the user data traffic over an Ethernet over GRE (EoGRE) tunnel to transmit said user data traffic to a network entity/core network, based on the positive response, wherein said routing further provides the requested service to the authenticated user device.

Further, another aspect of the invention relates to an edge device for routing user data traffic to a network entity, the edge device comprising a transceiver unit, configured to receive at least one data packet of user data traffic relating to a request for availing a service via an authenticated user device. Further the edge device comprising an identifying unit, configured to identify, one or more parameters from the at least one data packet of user data traffic, wherein the one or more parameters comprises at least one of a user device type, a URL type and an application type. Thereafter the edge device comprising a processing unit, configured to generate, one of a positive and a negative response based on the identified one or more parameters and a corresponding policy associated with each parameter, and route, the user data traffic over an Ethernet over GRE (EoGRE) tunnel to transmit said user data traffic to a network entity/core network, based on the positive response, wherein said routing further provides the requested service to the authenticated user device.

Another aspect of the invention relates to a system for routing user data traffic from an edge device to a network entity/core network, the system comprising an authenticated user device, configured to transmit a request for availing a service at a legacy access point associated with an edge device. The system further comprises an edge device, configured to receive, at least one data packet of user data traffic relating to the request received from the authenticated user device, identify, one or more parameters from the at least one data packet of user data traffic, wherein the one or more parameters comprises at least one of a user device type, a URL type and an application type, generate, one of a positive and a negative response based on the identified one or more parameters and a corresponding policy associated with each parameter, and route, the user data traffic over an Ethernet over GRE (EoGRE) tunnel to transmit said user data traffic to a network entity, based on the positive response. Thereafter, the system comprises the network entity/core network, configured to provide the requested service to the authenticated user device based on said routing of the user data traffic via the Ethernet over GRE (EoGRE) tunnel.

Yet, another aspect of the present invention relates to a non-transient computer readable medium comprising instructions for causing a computer to perform the method of receiving, at least one data packet of user data traffic relating to a request for availing a service, via an authenticated user device; identifying, one or more parameters from the at least one data packet of user data traffic, wherein the one or more parameters comprises at least one of a user device type, a URL type and an application type; generating, one of a positive and a negative response based on the identified one or more parameters and a corresponding policy associated with each parameter; and routing, the user data traffic over an Ethernet over GRE (EoGRE) tunnel to transmit said user data traffic to a network entity, based on the positive response, wherein said routing further provides the requested service to the authenticated user device.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
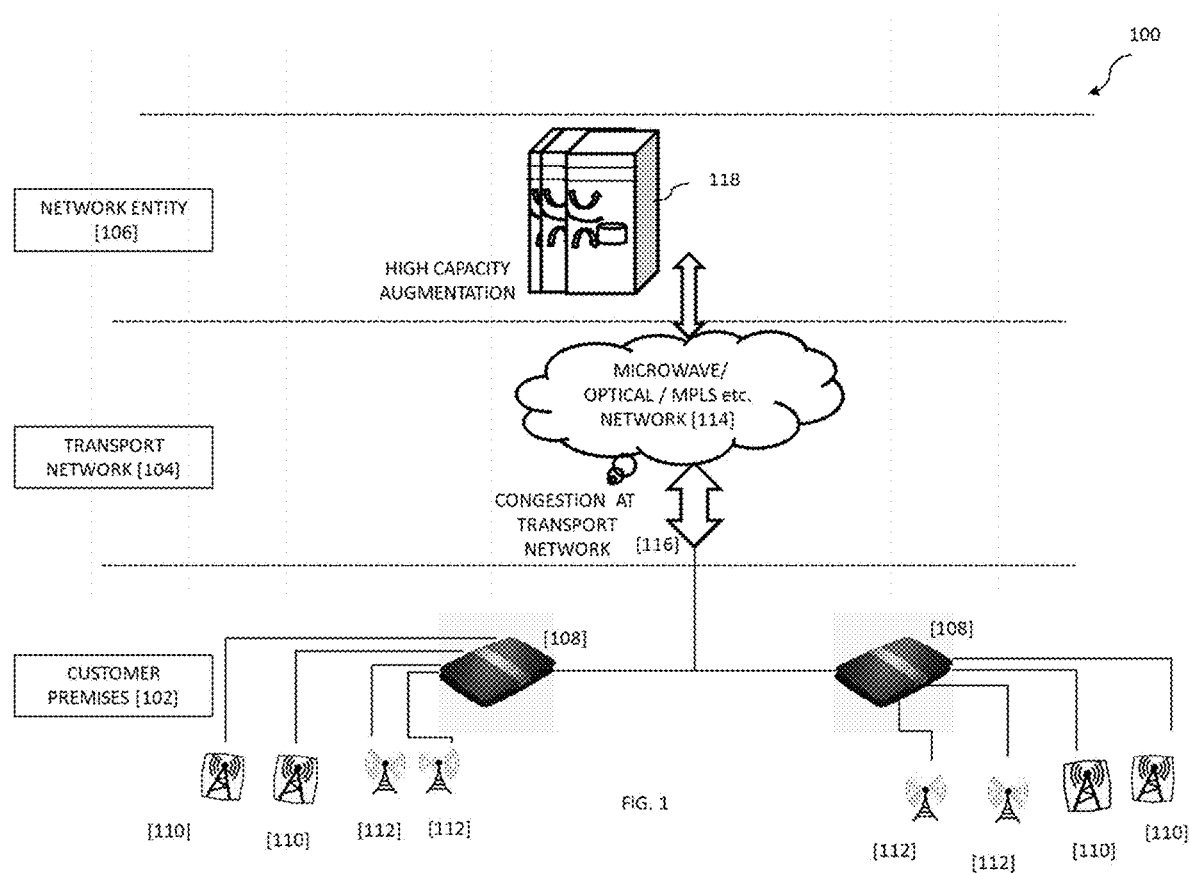
FIG. 1 illustrates an exemplary illustration of the challenges in the current known system architectures [100].

The foregoing shall be more apparent from the following more detailed description of the disclosure.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present disclosure provides a system, a method, an apparatus and a computer program product, to optimize a network at an edge device, for various services with growing traffic, by classification and processing the traffic at the edge device of the network that also includes dropping all unwanted traffic services at said edge device. Also, the present disclosure provide solution to prevent unnecessary loading of transport IP/MPLS network. Also, via hybrid (cloud and local processing) based architecture the present invention can help to give advantage of multi-tenant, multilevel-access and de-centralize control.

Further, the present disclosure in order to optimize the network at an edge device, for various services with growing traffic, provides a solution for routing a user data traffic from the edge device to a network entity. The present disclosure provides that the edge device is introduced at an enterprise network level to perform shallow packet inspection of user data traffic generated within the enterprise network, for availing a service via an authenticated user device. The authenticated user device is the user device that is authenticated by the enterprise network to provide at least one service.

Further, the edge device is associated with a legacy access point, wherein the legacy access point first receives a request for availing a service (for e.g., request for a URL) via the authenticated user device. The edge device associated with said legacy access point thereafter, receives at least one data packet of the user data traffic. Also, the at least one data packet of the user data traffic is received on at least one L2/L3 switch of the edge device.

Next, the edge device is thereafter configured to identify, one or more parameters from the at least one data packet of user data traffic, wherein the one or more parameters comprises at least one of a user device type, a URL type and an application type. The edge device further generates, one of a positive and a negative response based on the identified one or more parameters and a corresponding policy associated with each parameter. Further the generation of the positive and the negative response is further based on a shallow packet inspection (SPI) of user data traffic via the edge device. Also, the corresponding policy associated with each parameter further comprises a user policy associated with the user device type, a URL policy associated with the URL type and an application policy associated with the application type.

The edge device thereafter on the basis of the generated positive response, routes, the user data traffic over an Ethernet over GRE (EoGRE) tunnel to transmit said user data traffic to a network entity via a telecom interface over transport (IP/MPLS) network. Further, the network entity/core network provides the requested service to the authenticated user device based on said routing of the user data traffic to the network entity/core network, via the Ethernet over GRE (EoGRE) tunnel.

Also, the routing of the user data traffic via the Ethernet over GRE (EoGRE) tunnel, provides an interoperability for the legacy access point as the legacy access point do not support the EoGRE network interface for connectivity with the network entity. Therefore, said routing of the user data traffic by the edge device via the Ethernet over GRE (EoGRE) tunnel helps in interfacing with legacy access points which enterprises may have in their network, without having to change their infrastructure.

Furthermore, the edge device is also configured to block the authenticated user device from availing the requested service in an event the negative response is generated.

In the present disclosure, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner like the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internalor external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

As used herein, the term "infers" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

As used herein, a "user equipment", "user device", "smart-user device", "electronic device", "mobile station," "mobile subscriber station," "access terminal," "terminal," "handset," "appliance," "machine", and similar terminology refer to a wireless device utilized by a subscriber or user of a wireless communication service to receive and/or convey data associated with voice, video, sound, and/or substantially any data-stream or signaling-stream. Furthermore, the user equipment may be any electrical, electronic, and/or computing device or equipment, which is capable of implementing the features of the present disclosure and is obvious to a person skilled in the art. Also, the foregoing terms are utilized interchangeably in the subject specification and related drawings.

Likewise, the terms "local wireless communications cite," "access point" (AP), "base station," "Node B," "evolved Node B," "home Node B" (HNB), "home access point" (HAP), and the like are utilized interchangeably in the subject specification and drawings and refer to a network entity/wireless network component or apparatus that sends and/or receives data associated with voice, video, sound, and/or substantially any data-stream or signalling-stream between a set of subscriber stations-unless context warrants particular distinction(s) among the terms. Also, the network entity may include, but not limited to, a base station controller, a base transceiver station, a cell site, a Node B, an eNodeB, a radio network controller, and any such unit of a cellular wireless network obvious to a person skilled in the art. Further, the data and signalling streams can be packetized or frame-based flows.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. Also, the terms "local wireless communications site," "access point," "base station," and the like are utilized interchangeably throughout the subject specification and refer to devices that can receive and transmit signal(s) from and to wireless devices through one or more antennas. In addition, the terms "wireless network", "network entity" and "network" are used interchangeable in the subject application, unless context warrants particular distinction(s) among the terms.

As used herein, a "processing unit" or "processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "transceiver unit" may comprise one or more transmitter units and one or more receiver units, configured to transmit and receive respectively, at least one of one or more signals, data and commands from various units/modules of the electronic device/user device, edge device and/or the system, to implement the features of the present disclosure. The transceiver unit may be any such transmitting and receiving unit known to the person skilled in the art, to implement the features of the present invention.

As used herein, "memory unit" or "storage unit", refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, an "identifying unit" may be an intelligent unit having an analysing, computing and identifying capability, and/or the identifying unit may be any other such similar unit configured to implement the features of the present invention and is obvious to a person skilled in the art.

As used herein, an "inspection module" may be an intelligent unit having an analysing, computing and inspecting capability, and/or the inspection module may be any other such similar unit configured to implement the features of the present invention and is obvious to a person skilled in the art.

Also, the following sub-systems, specifications and the protocols are implemented in the present disclosure and are generally available protocols for communications between the user devices and the routing devices at network and device level. In one of the example, the routing device must support the required protocols and service like following:

The Protocol to connect to next hop gateway (protocols like EoGRE, GRE, IPSEC, L2VPN, CAPWAP etc.);

RADIUS protocol for SIM/device authentication (protocols like required EAP version EAP-AKA, EAP-AKA', EAP-SIM, WISP, certificate based etc.);

Seamless device protocols like Hotspot 2.0 releases to publish PLMN information or any other alternate protocol;

Traffic segregation per SSID based on network parameter (VLAN, IP, VRF etc.);

Publish location information like Location group name (equivalent to AP group name), Device MAC (equivalent to AP id), SSID NAME on radius messages (or other authentication flow);

By Limit the number of subscribers peFr ONT, per SSID etc.;

Bandwidth control per SSID (and PCRF to control per SSID and subscriber throughput). Bandwidth control polices can be applied manually or can be pushed from network.

The present disclosure is further explained in detail below with reference now to the diagrams.

Figure 2:
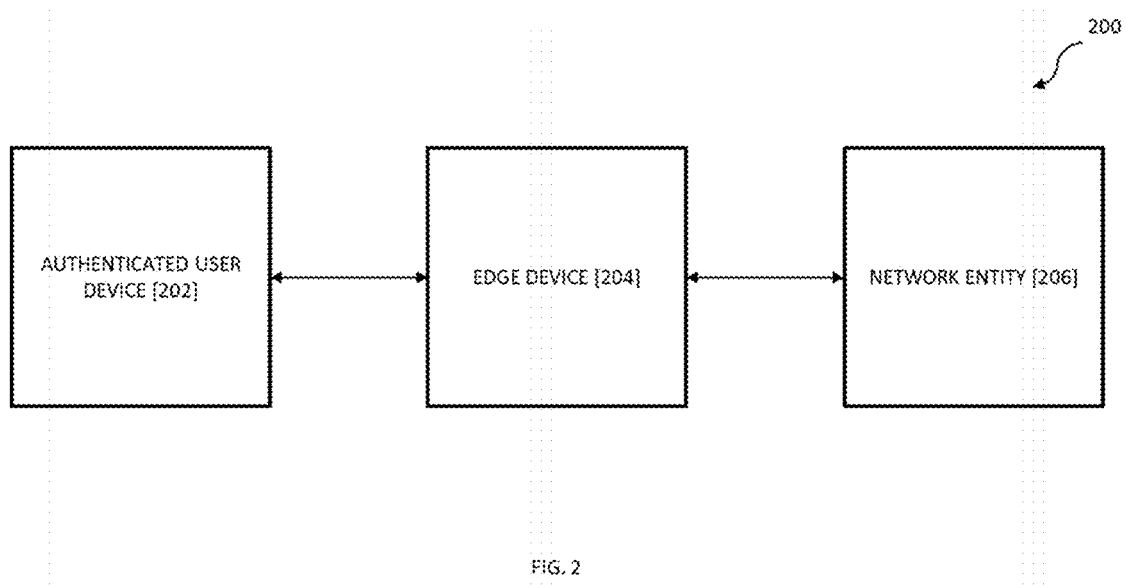
FIG. 2 illustrates a block diagram of the system [200], for routing user data traffic from an edge device to a network entity/core network, in accordance with exemplary embodiments of the present disclosure.

Referring to FIG. 2, an exemplary block diagram of the system [200], for routing user data traffic from an edge device to a network entity, in accordance with exemplary embodiments of the present disclosure is shown.

The system [200] comprises at least one authenticated user device [202], at least one edge device [204] and at least one network entity [206]. Further the system [200] may also comprises one or more units including but not limited to at least one access point/wireless access point, at least one cloud storage unit and any such unit obvious to a person skilled in the art, to implement the features of the present invention, but the same is not shown in FIG. 2 for the purpose of clarity. All of these components/units are assumed to be connected to each other unless otherwise indicated below. Also, in FIG. 2 only few units are shown, however the system [200] may comprise multiple such units or the system [200] may comprise any such numbers of said units, obvious to a person skilled in the art or as required to implement the features of the present invention.

The system [200], is configured for routing user data traffic from the edge device [204] to the network entity [206] with the help of the interconnection between the components/units of the system [200].

The at least one authenticated user device [202] is configured to transmit, at a legacy access point associated with an edge device [204], a request for availing a service. The legacy access point is a traditional access point that do not support the Ethernet over generic routing encapsulation (EoGRE) network interface for connectivity with a network entity [206]. Also, the authenticated user device [202] is a user device authenticated to avail at least one service via the network entity [206]. For instance, if the system [200] is implemented in an enterprise network, then an enterprise network owner may in said scenario provide authentication to one or more user devices to avail at least one service in said enterprise network.

The at least one edge device [204] associated with the legacy access point is further connected to the at least one authenticated user device [202]. The edge device [204] is configured to receive, at least one data packet of user data traffic relating to the request received from the authenticated user device [202]. Also, the at least one data packet of the user data traffic is received on at least one L2/L3 switch of the edge device [204].

Further, the edge device [204] is further configured to identify, one or more parameters from the at least one data packet of the user data traffic, wherein the one or more parameters comprises at least one of a user device type, a URL type and an application type. The user device type is one of an allowed user device and a barred user device. The allowed user device is a device which is allowed to avail the requested service and the barred user device is the user device which is not allowed to avail the requested service. Also, the URL type is one of a whitelisted URL and a blacklisted URL. The whitelisted URL is the URL having a permitted access for the authenticated user device [202] and the blacklisted URL is the URL having a denied access for the authenticated user device [202]. Also, the application type is one of an allowed application and a blocked application. The allowed application is the application having a permitted access for the authenticated user device [202] and the blocked application is the application having a denied access for the authenticated user device [202].

The edge device [204] is further configured to generate, one of a positive and a negative response based on the identified one or more parameters and a corresponding policy associated with each parameter. Further the generation of the positive and the negative response is further based on a shallow packet inspection (SPI) of user data traffic via the edge device. Also, the corresponding policy associated with each parameter further comprises a user policy associated with the user device type, a URL policy associated with the URL type, an application policy associated with the application type. The user policy comprises at least one of, one or more allowed user devices and one or more barred user devices. The URL policy comprises at least one of, one or more whitelisted URLs and one or more blacklisted URLs. The application policy comprises at least one of, one or more allowed applications and one or more blocked applications.

Also, the edge device [204] is further configured to store at least one of the user policy, the URL policy and the application policy. Further, the edge device [204] is configured to update at least one of the user policy, the URL policy and the application policy based on at least one update received via the network entity [206].

Further, the edge device [204] is configured to route, the user data traffic via an Ethernet over GRE (EoGRE) tunnel to transmit said user data traffic to the network entity [206], based on the generated positive response. The routed user data traffic is further transmitted to the network entity [206] via a telecom interface over transport (IP/MPLS) network.

The at least one network entity [206] is connected to the at least one edge device [204]. The network entity [206] is configured to provide the requested service to the authenticated user device [202], based on said routing of the user data traffic to the network entity [206] via the Ethernet over GRE (EoGRE) tunnel. Also, the routing of the user data traffic via the Ethernet over GRE (EoGRE) tunnel, provides an interoperability to the legacy access point as the legacy access point do not support the EoGRE network interface for connectivity with the network entity. Therefore, said routing of the user data traffic via the Ethernet over GRE (EoGRE) tunnel helps in interfacing with legacy access points which one or more enterprises may have in their network without having to change their infrastructure.

Furthermore, the edge device [204] is also configured to block the authenticated user device [202] from availing the requested service, in an event the negative response is generated.

The edge device [204] is also configured to perform packet inspection of the user data traffic via at least one of a firewall module and an antivirus module, wherein the packet inspection is performed in order to block one or more unwanted data packets of user data traffic based on said packet inspection. The unwanted data packets may include but not limited to malicious data packets, corrupt data packets etc. Also, the edge device is also configured to generate one or more analytics reports for the user data traffic based on at least one of the generated positive and negative response and the packet inspection of the user data traffic. In an instance the analytics report is generated to provide traffic visibility and control to an owner of the enterprise network where the system [200] is implemented. In an example the analytics report may comprise a total number of attempts performed via a blocked user device for a particular blacklisted URL and in one other example the analytics report may comprises details of data packets received in a user data traffic received from an allowed user device to avail a service.

Figure 3:
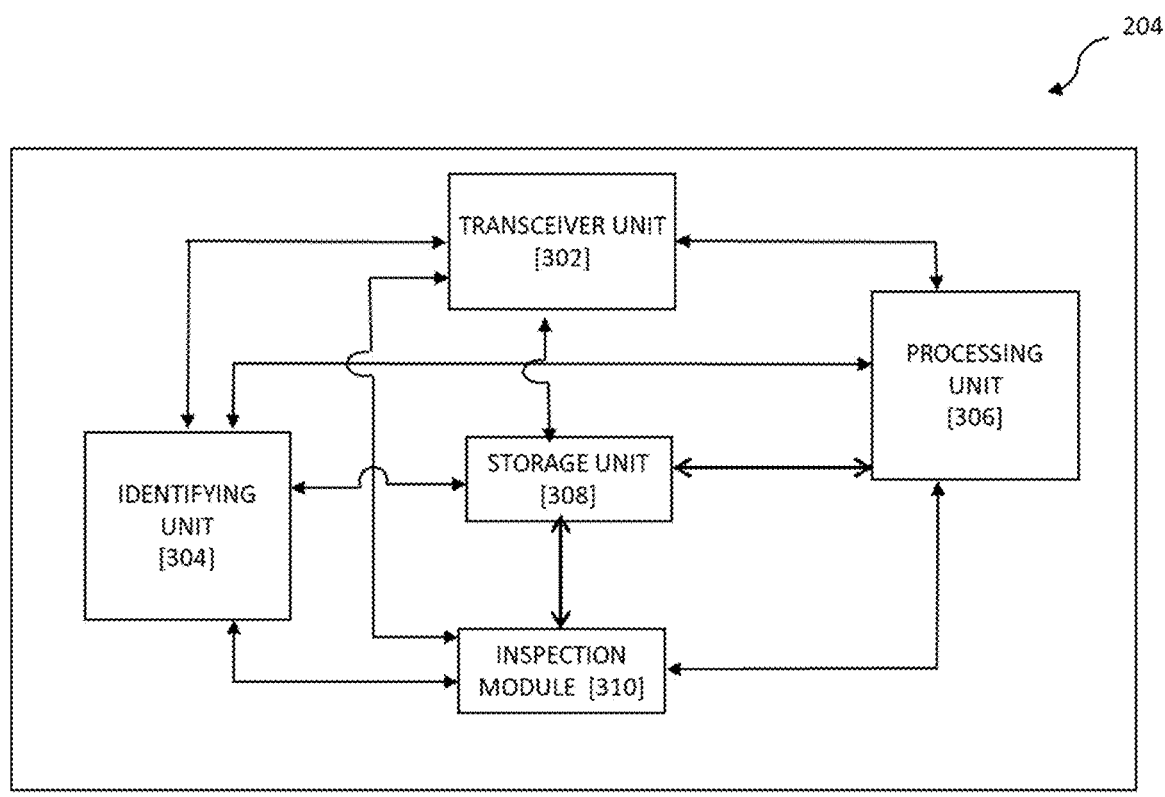
FIG. 3 illustrates an exemplary internal block diagram of an edge device [204], for routing user data traffic from an edge device to a network entity/core network, in accordance with exemplary embodiments of the present disclosure.

Referring to FIG. 3, an exemplary internal block diagram of an edge device [204], for routing user data traffic to a network entity/core network, in accordance with exemplary embodiments of the present disclosure is shown.

The edge device [204] comprises at least one transceiver unit [302], at least one processing unit [306], at least one identifying unit [304], at least one inspection module [308] and at least one storage unit [310]. All of these components/units are assumed to be connected to each other unless otherwise indicated below. Also, in FIG. 3 only few units are shown, however the edge device [204] may comprise multiple such units or the edge device [204] may comprise any such numbers of said units, obvious to a person skilled in the art or as required to implement the features of the present invention.

Furthermore, in an example some of the exemplary details of the edge device [204] may include:

1. Industry standard single or dual integrated power supply.
2. Modular network interfaces with options for load balancing and network resiliency.
3. Support for interface variants in any count/availability combination for enabling fiber or copper connectivity
   Gigabit Ethernet (1/10/100/1000 GBPS),
   Small Form-Factor Pluggable (SFP)-based connectivity,
   RJ-45 connections,
   POE/POE+ support with required power, etc.
4. High performance processor and support of high-speed WAN connections.
5. Storage to store offline policies, GUI/portal pages, configuration etc.
6. Management and additional storage variants in any count/availability combination:
   Console port availability.
   USB and mini type B USB console port1
   Traditional serial ports.
   Serial Advance Technology Attachment (SATA) or Small Computer System Interface (SCSI)
   HDMI port
7. Variants of random-access memory (RAM)
8. Interface controller—Encapsulations example (but not limited to below): Generic routing encapsulation (GRE), Ethernet, 802.1q VLAN, Point-to-Point Protocol (PPP), GRE, IPSec, Virtual Path, etc.
9. Protocol Support at SDWAN and routing-Switching module (but not limited to below):
   IPv4, IPv6, Dual stack, static routes, Routing Information Protocol Versions 1 and 2 (RIP and RIPv2), Open Shortest Path First (OSPF), Border Gateway Protocol (BGP), BGP authentication and path Attributes, Intermediate System-to-Intermediate System (IS-IS), Multicast Internet Group Management Protocol Version 3 (IGMPv3), Protocol Independent Multicast sparse mode (PIM SM), PIM Source-Specific Multicast (SSM), Resource Reservation Protocol (RSVP), Encapsulated Remote Switched Port Analyser (ERSPAN), IP Service-Level Agreements (IPSLA), Internet Key Exchange (IKE), access control lists (ACL), Ethernet Virtual Connections (EVC), Dynamic Host Configuration Protocol (DHCP), DNS, Virtual Router Redundancy Protocol (VRRP), RADIUS, authentication, authorization, and accounting (AAA), Application Visibility and Control (AVC), IPv4-to-IPv6 Multicast, MPLS, Layer 2 and Layer 3 VPN, IPsec, Layer 2 Tunnelling Protocol Version 3 (L2TPv3), Bidirectional Forwarding Detection (BFD), IEEE 802.1ag, and IEEE 802.3ah, Link Layer Discovery Protocol (LLDP), P2P link/31 IP support, Routing protocol's AD value manipulation, Assignment of source interface (SNMP, TACACS/RADIUS, FTP, TFTP, Syslog, NTP), Syslog IP assignment, NTP, Trans/Receive Power (In case of Fiber connectivity), etc.
10. Policy Controller Application
    Packet Filtering:
    Packet filtering on basis of all 8 tuples (source-IP address, destination-IP address, source-port, destination-port, protocol, vLAN-id, security zone)
    Packet Processing:
    Time stamping, ns-level, Slicing, Replication, IP fragment reassembling, VLAN tag adding or deleting,
    Identifying GTP upstream and downstream traffic, GRE/GTP/MPLS header stripping, Packet order preserving, data burst buffering
    Traffic Management:
    QoS, Class-Based Weighted Fair Queuing (CBWFQ), Weighted Random Early Detection (WRED), Policy-Based Routing (PBR).
    Cryptographic Algorithms:
    Encryption: DES, 3DES, AES-128 or AES-256
    Authentication: RSA (748/1024/2048 bit), ECDSA (256/384 bit);
    Integrity: MD5, SHA, SHA-256, SHA-384, SHA-512
    SaaS/IaaS: Optimized Office 365 Breakout, AWS, Azure
11. Classification for Packet Policy:
    Key words; key words+7-tuple rules to make detailed classification Gn, S1-MME, S11, S6a, S1-U, etc. protocols in PSC/EPC
12. SDWAN, ANALYTIC AND DPI Manageability:
    Cloud Orchestrator, On-premise control Centre, control Centre in AWS and Azure, CLI, SNMP, DHCP Server/Relay/Client, DNS Forwarder, Syslog, NetFlow, IPFIX, SOAP/REST API.

Further, referring to the FIG. 3, the edge device [204] is associated with a legacy access point. The legacy access point is a traditional access point that do not support the Ethernet over generic routing encapsulation (EoGRE) network interface for connectivity with a network entity [206]. Also, a user data traffic relating to a request for availing a service via an authenticated user device [202] is received at the legacy access point. The authenticated user device [202] is a user device authenticated to avail at least one service via the network entity [206]. For instance, if the edge device [204] is implemented in an enterprise network, then an enterprise network owner may in said scenario provide authentication to one or more user devices to avail at least one service in said enterprise network.

Further, the transceiver unit [302] of the edge device [204] is configured to receive at least one data packet of the user data traffic, relating to the received request for availing the service via the authenticated user device [202]. The at least one data packet of user data traffic is received on an at least one L2/L3 switch of the edge device [204] associated with the legacy access point.

The identifying unit [304] of the edge device [204] is connected with the transceiver unit [302]. The identifying unit [304] is configured to identify, one or more parameters from the at least one data packet of user data traffic, wherein the one or more parameters comprises at least one of a user device type, a URL type and an application type. The user device type is one of an allowed user device and a barred user device. The allowed user device is a device which is allowed to avail the requested service and the barred user device is the user device which is not allowed to avail the requested service. Also, the URL type is one of a whitelisted URL and a blacklisted URL. The whitelisted URL is the URL having a permitted access for the authenticated user device [202] and the blacklisted URL is the URL having a denied access for the authenticated user device [202]. Also, the application type is one of an allowed application and a blocked application. The allowed application is the application having a permitted access for the authenticated user device [202] and the blocked application is the application having a denied access for the authenticated user device [202].

The processing unit [306] is connected to the transceiver unit [302] and the identifying unit [304]. The processing unit [306] is configured to generate, one of a positive and a negative response based on the identified one or more parameters and a corresponding policy associated with each parameter. The generation of the positive and the negative response is further based on a shallow packet inspection (SPI) of user data traffic via the processing unit [306]. Further, the corresponding policy associated with each parameter further comprises a user policy associated with the user device type, a URL policy associated with the URL type, an application policy associated with the application type. The user policy comprises at least one of, one or more allowed user devices and one or more barred user devices. The URL policy comprises at least one of, one or more whitelisted URLs and one or more blacklisted URLs. The application policy comprises at least one of, one or more allowed applications and one or more blocked applications.

The storage unit [308] is connected to the transceiver unit [302], the identifying unit [304] and the processing unit [306]. The storage unit [308] is configured to store at least one of the user policy, the URL policy and the application policy. The processing unit [306] is further configured to update at least one of the user policy, the URL policy and the application policy based on at least one update received via the network entity [206].

The processing unit [306] is thereafter configured to route, the user data traffic over an Ethernet over GRE (EoGRE) tunnel to transmit said user data traffic to the network entity [206], based on the generated positive response, wherein said routing further provides the requested service to the authenticated user device [202]. Also, said routed user data traffic is transmitted to the network entity [206] via a telecom interface over transport (IP/MPLS) network. Further, the routing of the user data traffic to the network entity [206], via the Ethernet over GRE (EoGRE) tunnel, provides an interoperability to the legacy access point as the legacy access point do not support the EoGRE network interface for connectivity with the network entity [206]. Therefore said routing of the user data traffic to the network entity [206] via the Ethernet over GRE (EoGRE) tunnel helps in interfacing with legacy access points which one or more enterprises may have in their network without changing their infrastructure.

Further, the processing unit [306] is also configured to block the authenticated user device [202] from availing the requested service, in an event the negative response is generated.

The processing unit [306] is also configured to perform packet inspection of the user data traffic via at least one of a firewall module and an antivirus module, wherein the packet inspection is performed in order to block one or more unwanted data packets of user data traffic based on said packet inspection. The unwanted data packets may include but not limited to malicious data packets, corrupt data packets, denied data packets etc. Also, the processing unit [306] is also configured to generate one or more analytics reports for the user data traffic based on at least one of the generated positive response, the generated negative response and the packet inspection of the user data traffic. In an instance the analytics report is generated to provide traffic visibility and control to an owner of the enterprise network where the edge device [204] is implemented. In an example the analytics report may comprise a total number hits for a particular whitelisted URL in a given time period along with one or more details of user traffic generated during said particular time period for various other URLs providing similar services as that of said particular whitelisted URL.

Figure 4:
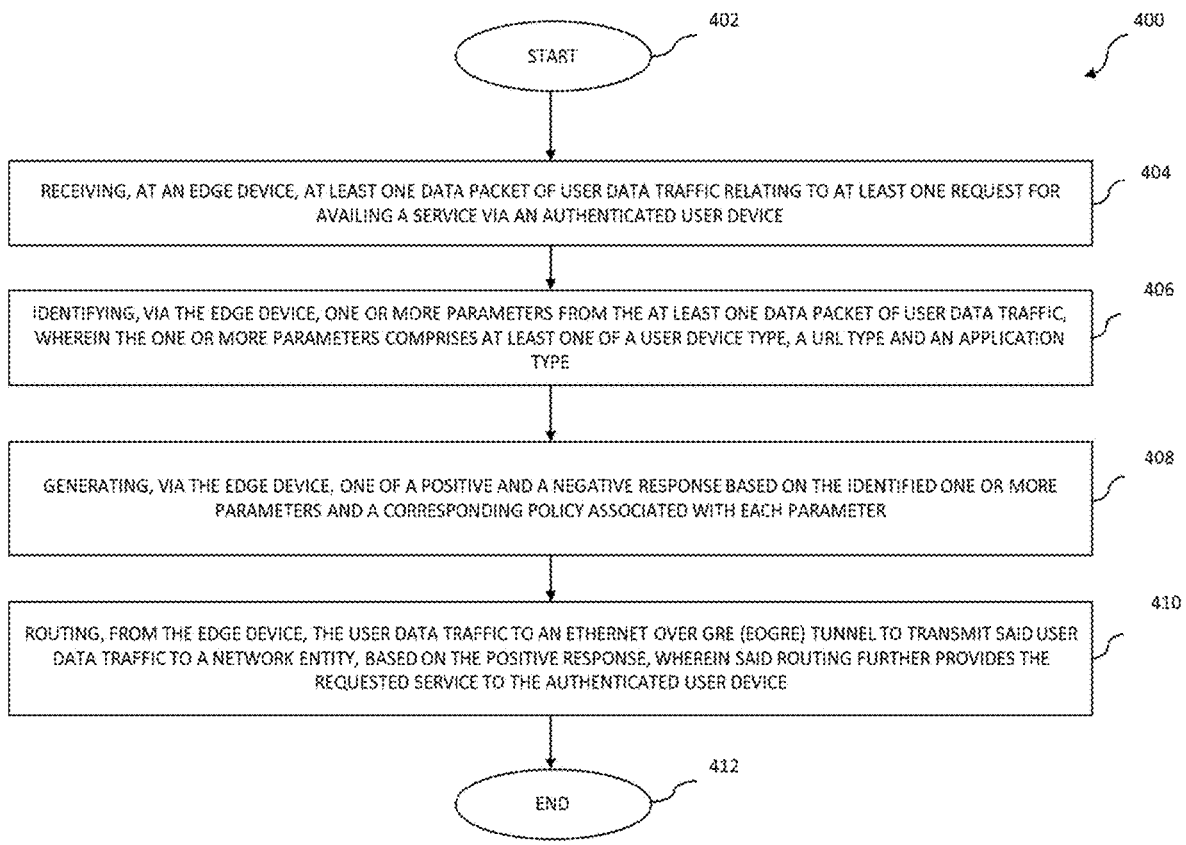
FIG. 4 illustrates an exemplary method flow diagram [400], depicting method of routing user data traffic from an edge device to a network entity, in accordance with exemplary embodiments of the present disclosure.

Furthermore, in an example some of the features of the edge device [204] are listed as below:
  URL filtering: Incremental URL database build over the edge device [204] and use URL database for filtering (allowing/blocking) by various categories.
  SDWAN: SDWAN technology is applied to WAN connections in the edge device [204], such as intranet, broadband internet, cellular backhaul or MPLS. It connects enterprise networks.
  APP Control: Comprehensive app identification and control to improve work efficiency.
  Traffic Steering: Traffic steering per vLAN or application or per destination.
  Centralized Management: Unifying configuration and policy, external data centre for log store for system administrators.
  Analytics: Based on various parameters like policy, Application and Users.
  Bandwidth Optimization: Point to Point Optimization tunnel one time add on module.
  Authentication: Centralized RADIUS, LDAP, Local and portal authentication.
  Traffic Control: Rational bandwidth allocation ensure the smooth operation of the core business.
  Firewall and Anti-Virus: With $3^{rd}$ party signature subscription Referring to FIG. 4, an exemplary method flow diagram [400], depicting method of routing user data traffic from an edge device to a network entity, in accordance with exemplary embodiments of the present disclosure is shown. As shown in FIG. 4, the method begins at step [402].

At step [404], the method comprises receiving, at an edge device [204], at least one data packet of user data traffic, relating to a request for availing a service via an authenticated user device [202]. The edge device [204] is associated with a legacy access point. The legacy access point is a traditional access point that do not support the Ethernet over generic routing encapsulation (EoGRE) network interface for connectivity with a network entity [206]/core network. Also, the user data traffic relating to the request for availing the service via the authenticated user device [202] is first received at the legacy access point. Thereafter, the method encompasses receiving the at least one data packet of user data traffic at an edge device [204], wherein the at least one data packet of user data traffic is received on at least one L2/L3 switch of said edge device [204]. Further, the authenticated user device [202] is a user device authenticated to avail at least one service via the network entity [206]. For instance, if the edge device [204] is implemented in an enterprise network, then an enterprise network owner may in said scenario provide authentication to one or more user devices to avail at least one service in said enterprise network.

Thereafter, at step [406], the method comprises identifying, via the edge device [204], one or more parameters from the at least one data packet of user data traffic, wherein the one or more parameters comprises at least one of a user device type, a URL type and an application type. The user device type is one of an allowed user device and a barred user device. The allowed user device is a device which is allowed to avail the requested service and the barred user device is the user device which is not allowed to avail the requested service. Also, the URL type is one of a whitelisted URL and a blacklisted URL. The whitelisted URL is the URL having a permitted access for the authenticated user device [202] and the blacklisted URL is the URL having a denied access for the authenticated user device [202]. Also, the application type is one of an allowed application and a blocked application. The allowed application is the application having a permitted access for the authenticated user device [202] and the blocked application is the application having a denied access for the authenticated user device [202].

Next, at step [408], the method comprises generating, via the edge device, one of a positive and a negative response based on the identified one or more parameters and a corresponding policy associated with each parameter. The method also encompasses generating the positive and the negative response based on a shallow packet inspection (SPI) of the at least one data packet of the user data traffic via the edge device [204]. Further, the corresponding policy associated with each parameter further comprises a user policy associated with the user device type, a URL policy associated with the URL type, an application policy associated with the application type. The user policy comprises at least one of, one or more allowed user devices and one or more barred user devices. The URL policy comprises at least one of, one or more whitelisted URLs and one or more blacklisted URLs. The application policy comprises at least one of, one or more allowed applications and one or more blocked applications.

Next, the method also encompasses storing at the edge device [204], at least one of the user policy, the URL policy and the application policy. Also, the method comprises updating the at least one of the user policy, the URL policy and the application policy based on at least one update received via the network entity [206].

Further, at step [410], the method comprises routing, from the edge device [204], the user data traffic over an Ethernet over GRE (EoGRE) tunnel to transmit said user data traffic to the network entity [206], based on the positive response, wherein said routing further provides the requested service to the authenticated user device [202]. Also, said routed user data traffic is transmitted to the network entity [206] via a telecom interface over transport (IP/MPLS) network. Further, the routing of the user data traffic to the network entity [206], via the Ethernet over GRE (EoGRE) tunnel, provides an interoperability for the legacy access points as the legacy access points do not support the EoGRE network interface for connectivity with the network entity [206]/core network. Therefore said routing of the user data traffic to the network entity [206] via the Ethernet over GRE (EoGRE) tunnel helps in interfacing with legacy access points which one or more enterprises may have in their network without changing their infrastructure.

Next, the method also encompasses blocking the authenticated user device [202] from availing the requested service in an event the negative response is generated.

Next, the method also comprises performing via the edge device [204], a packet inspection of the user data traffic. Also, the method thereafter encompasses blocking one or more unwanted data packets of user data traffic based on said packet inspection. Also, the unwanted data packets may include but not limited to malicious data packets, corrupt data packets, denied data packets etc.

Further, the method also encompasses generating via the edge device [204], one or more analytics reports for the user data traffic based on at least one of the generated positive response, the generated negative response and the packet inspection of the at least one packet of the user data traffic. In an instance the analytics report is generated to provide traffic visibility and control to an owner of the enterprise network where the edge device [204] is implemented.

After successfully routing user data traffic from the edge device [204] to the network entity [206], the method further terminates at step [412].

Yet, another aspect of the present invention relates to a non-transient computer readable medium comprising instructions for causing a computer to perform the method of receiving, at least one data packet of user data traffic relating to a request for availing a service, via an authenticated user device; identifying, one or more parameters from the at least one data packet of user data traffic, wherein the one or more parameters comprises at least one of a user device type, a URL type and an application type; generating, one of a positive and a negative response based on the identified one or more parameters and a corresponding policy associated with each parameter; and routing, the user data traffic over an Ethernet over GRE (EoGRE) tunnel to transmit said user data traffic to a network entity, based on the positive response, wherein said routing further provides the requested service to the authenticated user device.

Also, an exemplary illustration of System interfaces over which location information is shared in accordance with exemplary embodiments of the present disclosure is shown below in Table 1. The edge device has been referred to as (CPE).

| Interface | Description |
| --- | --- |
| AP < > CPE, | AP to CPE interface is L2 Interface |
| CPE < > WLC | CPE to WLAN controller can be on radius or diameter |
| CPE < > Gateway | CPE to gateway interface need to be encrypted and/or encapsulated for secure communication (EOGRE). |
| AAA - AAA-DBDB | To download the user subscription profile and store/update accounting records (Using SQL) |
| AAA - Location Aware Server (Portal, SMS, Notification, LBS) | RADIUS is used, primarily to update AAA once the user is authenticated |
| Location Aware Server- SPR/OCS | SOAP/REST interface for provisioning the Plan, retrieving quota, update quota/validity etc |
| Wi-Fi Gateway - PCRF (Gx) | To authorize users & download policies for users |
| Wi-Fi Gateway - OCS (Gy) | To authorize users & download quota for pre- paid users |
| CPE-PCRF | 3GPP interface like Sd interface, for traffic detection and reports information regarding the detected application traffic to the Policy and Charging Control Function (PCRF) |
| CPE-OCS | 3GPP Gy interface |

Therefore, the technologies can provide a deeply customizable URL Filtering capability that is scalable, cost-efficient and easily manageable from the network entity [206]. Also, the technologies can provide a configurable level of administrators for each tenant who can change network policies (according to level) for thousands of users. Further, the edge device [204] can be customized to deliver any browsing experience that the service provider chooses, featuring a comprehensive URL Filtering capability and lot more.

As the unwanted traffic is dropped at edge device [204], it saves precious bandwidth on transport network. Similarly, the network entity [206] is protected from outside attacks by not allowing it to spread beyond the local domain. The present solution also proposes a single tunneling interface at core to simplify the network.

Figure 5:
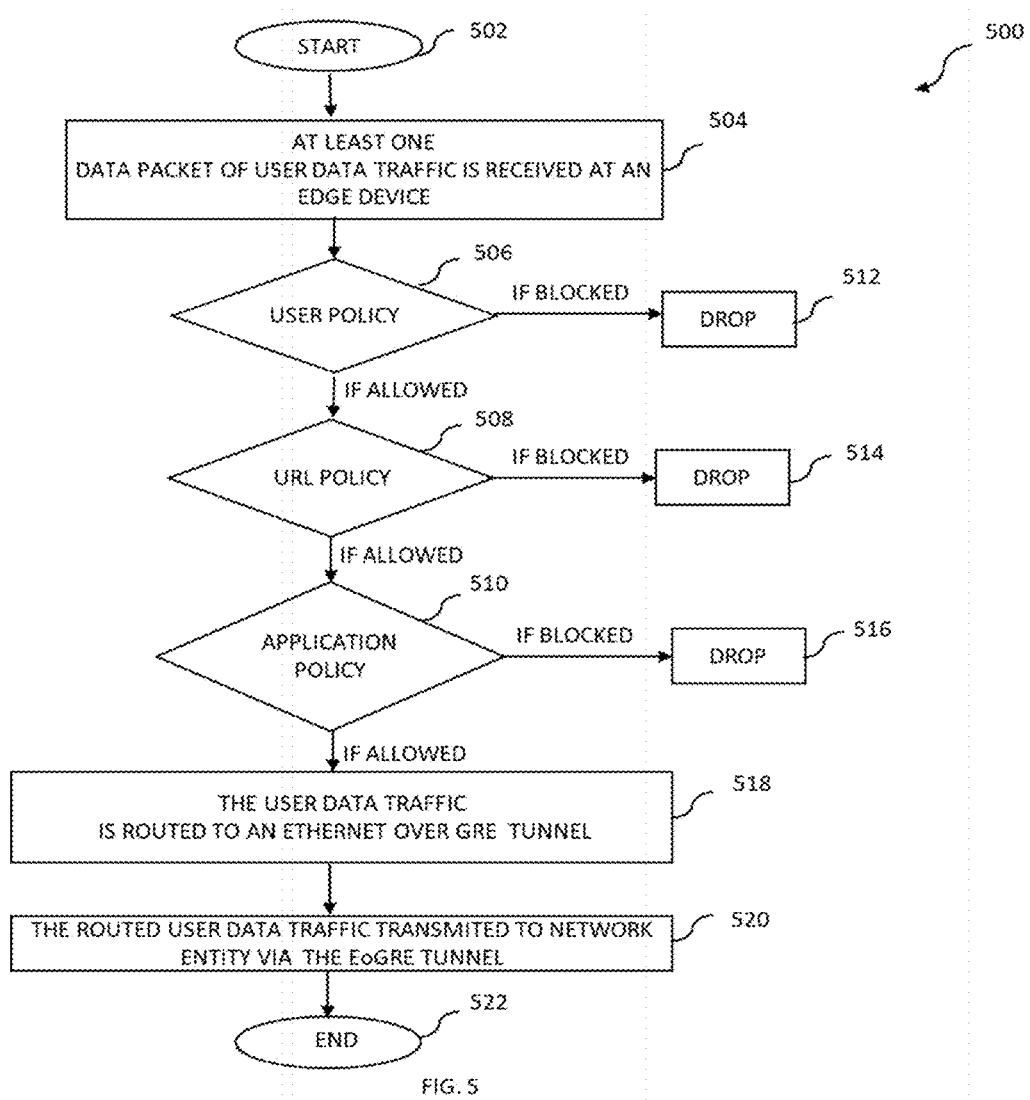
FIG. 5 illustrates an exemplary signalling flow diagram [500], depicting a process of routing user data traffic from an edge device to a network entity, in accordance with exemplary embodiments of the present disclosure.

Referring to FIG. 5, an exemplary signalling flow diagram, depicting a process of routing user data traffic from an edge device to a network entity, in accordance with exemplary embodiments of the present disclosure is shown. As shown in FIG. 5, the process begins at step [502].

At step [504], the method of the exemplary process encompasses receiving, at an edge device [204], at least one data packet of the user data traffic relating to a request for availing a service via an authenticated user device [202]. The service may be at least one of a service provided via a network entity [206] for accessing any particular URL, any specific application or the like. Further, after the receipt of the at least one data packet of the user data traffic, the process next leads to step [506].

Next at step [506] the method encompasses, checking whether the authenticated user device [202] is an allowed user device or a barred user device for availing the requested service, wherein the checking is based on a user policy. Further if the authenticated user device [202] is determined to be the allowed user device, the process leads to step [508] otherwise the process will lead to step [512]. The process further stops at the step [512] and the received request for availing the service via the authenticated user device [202] is dropped/denied.

Next at step [508] the method encompasses, checking whether the requested URL is a whitelisted URL or a blacklisted URL for the allowed authenticated user device [202], wherein the checking is based on a URL policy. Further if the requested URL is determined to be the whitelisted URL, the process leads to step [510] otherwise the process will lead to step [514]. The process further stops at the step [514] and the received request for availing the service via the authenticated user device [202] is dropped/denied.

Next at step [510] the method encompasses, checking whether the requested application is an allowed application or a blocked application for the authenticated user device [202], wherein the checking is based on an application policy. Further if the requested application is determined to be the allowed application, the process leads to step [518] otherwise the process will lead to step [516]. The process further stops at the step [516] and the received request for availing the service via the authenticated user device [202] is dropped/denied.

Next at step [518] the method encompasses, routing the user data traffic from the edge device [204] over an Ethernet over GRE tunnel.

Next at step [520] the method encompasses transmitting to the network entity [206], the routed data traffic via the EoGRE tunnel, to further provide the requested service to the authenticated user device [202] via the network entity [206]. The routed user data traffic is transmitted to the network entity [206] via a telecom interface over transport (IP/MPLS) network.

After successfully routing user data traffic from the edge device [204] to the network entity [206], the process further terminates at step [522].

Furthermore, a various use case scenarios of the present disclosure are listed as below:
1. Hybrid edge device [204] based management with benefit: Cloud based, central and on-premise architecture
2. SDWAN (Software-defined Wide Area Network) functions
3. Analytics
4. UE auto provision and registration
5. Cloud configuration provisioning supported
6. On-demand grouping, centralized management
7. Batch auto upgrade
8. Cloud log saving
9. Cloud based analytic
10. Encrypted transmission of control information While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:
1. A method of routing user data traffic from an edge device to a network entity, the method comprising:
receiving, at an edge device, at least one data packet of user data traffic relating to a request for availing a service, via an authenticated user device;
identifying, via the edge device, one or more parameters from the at least one data packet of user data traffic, wherein the one or more parameters comprises at least one of a user device type, a Uniform Resource Locator (URL) type and an application type;
generating, via the edge device, one of a positive and a negative response based on the identified one or more parameters and a corresponding policy associated with each parameter;
routing, from the edge device, the user data traffic over an Ethernet over Generic Routing Encapsulation (EoGRE) tunnel to transmit said user data traffic to a network entity, based on the positive response, wherein said routing further provides the requested service to the authenticated user device.

2. The method as claimed in claim 1, wherein the corresponding policy associated with each parameter further comprises a user policy associated with the user device type, a URL policy associated with the URL type, an application policy associated with the application type.

3. The method as claimed in claim 2, wherein:
the user policy comprises at least one of, one or more allowed user devices and one or more barred user devices,
the URL policy comprises at least one of, one or more whitelisted URLs and one or more blacklisted URLs, and
the application policy comprises at least one of, one or more allowed applications and one or more blocked applications.

4. The method as claimed in claim 2, the method further comprises updating at the edge device, the user policy, the URL policy and the application policy based on at least one update received via the network entity.

5. The method as claimed in claim 1, the method further comprises blocking the authenticated user device from availing the service in an event the negative response is generated.

6. The method as claimed in claim 1, the method further comprises performing a packet inspection of the user data traffic via the edge device.

7. The method as claimed in claim 5, the method further comprises blocking one or more unwanted data packets of user data traffic based on said packet inspection of the user data traffic.

8. An edge device for routing user data traffic to a network entity, the edge device comprising:
  a transceiver unit, configured to receive at least one data packet of user data traffic relating to a request for availing a service via an authenticated user device;
  an identifying unit, configured to identify, one or more parameters from the at least one data packet of user data traffic, wherein the one or more parameters comprises at least one of a user device type, a Uniform Resource Locator (URL) type and an application type;
  a processing unit, configured to:
  generate, one of a positive and a negative response based on the identified one or more parameters and a corresponding policy associated with each parameter, and
  route, the user data traffic over an Ethernet over Generic Routing Encapsulation (EoGRE) tunnel to transmit said user data traffic to a network entity, based on the positive response, wherein said routing further provides the requested service to the authenticated user device.

9. A system for routing user data traffic from an edge device to a network entity, the system comprising:
  an authenticated user device, configured to transmit at a legacy access point associated with an edge device, a request for availing a service;
  an edge device, configured to:
  receive, at least one data packet of user data traffic relating to the request received from the authenticated user device,
  identify, one or more parameters from the at least one data packet of user data traffic, wherein the one or more parameters comprises at least one of a user device type, a Uniform Resource Locator (URL) type and an application type,
  generate, one of a positive and a negative response based on the identified one or more parameters and a corresponding policy associated with each parameter, and
  route, the user data traffic over an Ethernet over Generic Routing Encapsulation (EoGRE) tunnel to transmit said user data traffic to a network entity, based on the positive response;
  the network entity, configured to provide the requested service to the authenticated user device based on said routing of the user data traffic to the network entity via the Ethernet over GRE (EoGRE) tunnel.

10. A non-transient computer readable medium comprising instructions for causing a computer to perform a method comprising:
  receiving, at least one data packet of user data traffic relating to a request for availing a service, via an authenticated user device;
  identifying, one or more parameters from the at least one data packet of user data traffic, wherein the one or more parameters comprises at least one of a user device type, a Uniform Resource Locator (URL) type and an application type;
  generating, one of a positive and a negative response based on the identified one or more parameters and a corresponding policy associated with each parameter; and
  routing, the user data traffic over an Ethernet over Generic Routing Encapsulation (EoGRE) tunnel to transmit said user data traffic to a network entity, based on the positive response, wherein said routing further provides the requested service to the authenticated user device.

* * * * *